US006862512B2

United States Patent
Arndt et al.

(10) Patent No.: US 6,862,512 B2
(45) Date of Patent: Mar. 1, 2005

(54) METHOD AND SYSTEM FOR CONTROLLING THE PERFORMANCE OF A MOTOR VEHICLE

(75) Inventors: Dietmar Arndt, Kleinsachsenheim (DE); Anja Wahl, Moeglingen (DE); Stefan Hillenbrand, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/332,670

(22) PCT Filed: Apr. 26, 2002

(86) PCT No.: PCT/DE02/01537
§ 371 (c)(1),
(2), (4) Date: Jun. 16, 2003

(87) PCT Pub. No.: WO02/090161

PCT Pub. Date: Nov. 14, 2002

(65) Prior Publication Data
US 2004/0030479 A1 Feb. 12, 2004

(30) Foreign Application Priority Data
May 10, 2001 (DE) .......................... 101 22 654

(51) Int. Cl.$^7$ .............................. G06F 7/00; G06F 17/00
(52) U.S. Cl. ........................... 701/70; 701/74; 701/75; 701/41; 180/197; 180/6.2; 180/252
(58) Field of Search ..................... 701/70, 74, 75, 701/41; 180/197, 252, 6.2

(56) References Cited

U.S. PATENT DOCUMENTS 6,052,641 A * 4/2000 Wuerth et al. ................. 701/70
6,256,570 B1 * 7/2001 Weiberle et al. .............. 701/70
6,449,543 B2 * 9/2002 Nishizaki et al. ............. 701/41

FOREIGN PATENT DOCUMENTS

| DE | 196 24 795 | 1/1998 |
| DE | 197 44 725 | 4/1999 |
| DE | 199 43 333 | 2/2001 |
| DE | 199 50 477 | 4/2001 |
| EP | 0 829 401 | 3/1998 |
| EP | 0 943 515 | 9/1999 |

* cited by examiner

Primary Examiner—Olga Hernandez
(74) Attorney, Agent, or Firm—Kenyon & Kenyon

(57) ABSTRACT

A method for controlling the handling characteristics of a vehicle, including the steps of ascertaining setpoint values that are associated with specific controlled variables, and measuring forces at wheels of the vehicle, the controlled variables being forces or torques, actual values associated with the setpoint values being calculated from the forces measured at the wheels of the vehicle, and the ascertained setpoint values and the calculated actual values being used as input values of a control system. Also described is a system for controlling the handling characteristics of a vehicle.

24 Claims, 3 Drawing Sheets

METHOD AND SYSTEM FOR CONTROLLING THE PERFORMANCE OF A MOTOR VEHICLE

FIELD OF THE INVENTION

The invention relates to a method for controlling the handling characteristics of a vehicle, having the steps of: ascertaining setpoint values that are associated with specific controlled variables; and measuring forces at the wheels of the vehicle. The invention further concerns a system for controlling the handling characteristics of a vehicle, having means for ascertaining setpoint values that are associated with specific controlled variables, and means for measuring forces at the wheels of the vehicle.

BACKGROUND INFORMATION

In methods and systems of the species, detection of critical driving situations and calculation of control interventions are generally accomplished on the basis of the following measured variables:

Yaw velocity $\dot{\Psi}$

Transverse acceleration $a_y$

Steering angle at front wheel $\delta$

Wheel rotation speed at all four wheels

Brake pre-pressure

Accelerator pedal position

Variables derived from these variables, ascertained e.g. by estimation, are also used. The most important variables for the control methods and control systems according to the existing art are the measured yaw velocity $\dot{\Psi}$ and the float angle [beta] of the vehicle, estimated using other variables. In a control system based on yaw velocity $\dot{\Psi}$, for example, a target yaw velocity is compared to an actual yaw velocity. If the actual yaw velocity deviates from the target yaw velocity, that difference is converted into control signals for specific actuating elements whose actuation then causes the actual yaw velocity to approach the target yaw velocity. A disadvantage of this kind of vehicle dynamics control system based, for example, on yaw velocity $\dot{\Psi}$ is, however, that the yaw velocity, like the float angle $\beta$, is a secondary variable; in other words, the control system is not acting on the primary physical variables that are responsible for the vehicle's handling characteristics.

It has already been proposed to measure wheel forces using tire sensors, and to use those wheel forces as controlled variables of a control loop. In this context, the sensor signals of the individual tires are recalculated directly in a wheel force controller and converted by the control system into actions that can be applied to the vehicle. This results in a short processing time between acquisition of the actual values and intervention on the handling characteristics of the vehicle.

Wheel forces can also be measured using wheel bearing sensors. These can be configured, for example, in such a way that microsensors are built into the rotating portion of the wheel bearing. Forces and accelerations, as well as the rotation speed, can thus be measured by microsensors mounted on the movable portion of the wheel bearing. These data can then be compared to electronically stored baseline patterns. Additional microsensors can also be built into the static portion of the wheel bearing. These data from these microsensors can be used as comparative values for evaluation of the data measured by the sensors mounted on the movable portion of the wheel bearing. The microsensors can be implemented, for example, in the form of microswitch arrays, movable flexural beam systems being provided which are capable of moving laterally, in response to force, against two or more mechanical stops.

SUMMARY OF THE INVENTION

The present invention builds upon the method of the species in that the controlled variables are forces or torques; that actual values associated with the setpoint values are calculated from the forces measured at the wheels of the vehicle; and that the ascertained setpoint values and the calculated actual values are used as input values of a control system. The invention thus makes available an improvement to vehicle dynamics control systems that are based substantially on the yaw velocity and float angle of a vehicle, since torques or torques are used as controlled variables. It is also no longer necessary, as it was in the existing art discussed above, to use the wheel forces of the individual wheels as controlled variables. Instead, it is possible to conceive of controlled variables that are calculated from the measured wheel forces. A flexible method, with which the dynamics of a vehicle can be improved in many ways, is thus made available.

The method is developed, with particular advantage, in that the setpoint values take into account a request by the driver to maintain or modify the present vehicle state. Such driver requests may be represented, for example, by the steering wheel angle, brake pre-pressure, or accelerator pedal position. For all these variables, sensors can be provided whose measurement results influence the setpoint values for controlling the handling characteristics.

It is particularly advantageous that the lateral force at the center of gravity of the vehicle is used as a controlled variable. During cornering, the lateral force at the center of gravity of the vehicle is a primary variable that influences the vehicle's handling characteristics. In that respect it is suitable for use as a controlled variable for purposes of the present invention.

For the same reason, it is advantageous that the torque about the vertical axis of the vehicle is used as a controlled variable.

In particularly advantageous fashion, the invention is developed in that the setpoint value of the lateral force is determined according to the following equation:

$$F_{y,setpoint} = m \cdot \frac{v^2}{l} \delta \frac{1}{1 + \left(\frac{v}{v_{CH}}\right)^2},$$

where $F_{y,setpoint}$=Setpoint value of the lateral force at the center of gravity of the vehicle;

m=Vehicle mass;

v=Vehicle speed;

l=Wheelbase;

$\delta$=Steering angle at front wheels;

$v_{CH}$=Characteristic speed.

The setpoint value of the lateral force is thus obtained from current driving conditions that are represented by the speed v, and from vehicle-specific parameters, namely the mass m, wheelbase l of the vehicle, and characteristic speed $v_{CH}$ (see M. Mitschke, Dynamik der Kraftfahrzeuge [Dynamics of motor vehicles], Vol. C: Fahrverhalten [Handling characteristics], Springer-Verlag Berlin, Heidelberg 1990). The steering angle $\delta$ at the front wheels is also involved, as a critical variable, in the determination of the setpoint value of the lateral force, thus representing the driver request. The lateral force referred to is ultimately the product of the vehicle mass and transverse acceleration, although it is assumed for purposes of this calculation that the float angle is small. The time response characteristics of the force increase must also be taken into account, since the lateral force lags behind the steering angle δ with a delay, depending on the vehicle speed, of e.g. 0.1 second.

Provision can also advantageously be made for the setpoint value of the torque about the vertical axis of the vehicle to be determined according to the following equation:

$$M_{Z,setpoint} = J_Z \cdot \frac{v}{l} \dot{\delta} \frac{1}{1 + \left(\frac{v}{v_{CH}}\right)^2},$$

where $M_{z,setpoint}$=Setpoint value of the torque about the vertical axis of the vehicle;
m=Vehicle mass;
v=Vehicle speed;
l=Wheelbase;
$\dot{\delta}$=Steering angle rate at the front wheels;
$v_{CH}$=Characteristic speed.

The torque about the vertical axis of the vehicle is thus the product of the torque of inertia $J_z$ and the target yaw acceleration $\Psi_{setpoint}$. In addition to the torque of inertia $J_z$, the characteristic speed VCH and the wheelbase l of the vehicle are again involved as vehicle-specific parameters.

The method according to the present invention is usefully developed by the fact that the actual value of the lateral force is determined according to the following equation:

$$F_y = (F_{y1} + F_{y2})\cos\delta + F_{y3} + F_{y4},$$

where $F_y$=Actual value of the lateral force at the center of gravity of the vehicle;
Fyi=Wheel force measured at wheel i
δ=Steering angle at front wheels (i=1, 2).

The lateral force used as controlled variable can thus be calculated from the steering angle and the measured wheel forces.

In similarly advantageous fashion, provision is made for the actual value of the torque about the vertical axis of the vehicle to be determined according to the following equation:

$$M_z = (F_{y1} + F_{y2})l_v\cos\delta - (F_{y3} + F_{y4})l_H + (F_{y1} - F_{y2})\frac{S_v}{2}\sin\delta,$$

where $F_y$=Actual value of the lateral force at the center of gravity of the vehicle;
Fyi=Wheel force measured at wheel i;
δ=Steering angle at front wheels (i=1, 2);
$1_v$=Distance of front wheels (i=1, 2) from center of gravity;
$1_H$=Distance of rear wheels (i=3, 4) from center of gravity;
$S_v$=Track at front axle (i=1, 2).

The actual value of the torque can thus be calculated in clearly evident fashion from the wheel forces, the vehicle-specific variables $1_v$, $1_H$, and $S_v$, and the steering angle representing the driver request.

Control is preferably accomplished via braking interventions. Such braking interventions are also utilized in the context of vehicle dynamics control systems of the existing art, and can be used e.g. to regulate the torque about the vertical axis.

It may also be useful, however, for control to be accomplished via steering interventions. An individual-wheel steering system can be used here with particular advantage.

In a further preferred variant of the method according to the invention, that method is developed by the fact that control is accomplished by influencing the vehicle speed. For example, if the actual value ascertained for the lateral force is less than the setpoint value, the lateral force required for the driver request can no longer be transferred to the road surface. In other words, the driver request can no longer be complied with. The lateral force required can thus be decreased by way of an active braking intervention. Additionally or alternatively, an intervention by way of the engine control system is also possible. For the situation described, i.e. an actual value that lies below the lateral force setpoint value, it is also possible to use regulation of the torque about the vertical axis.

It is additionally useful, in the context of the method according to the present invention, to provide for use of an estimator that generates, from ascertained input values, output values that are taken into account in calculating the actual values and/or setpoint values. For example, an estimator can be employed for determination of the vehicle speed. The output values of the estimator can also be used to calculate, from the forces measured at the wheels, the actual values of the forces at the center of gravity and of the torque about the vertical axis. The estimator can contain a model of the vehicle being controlled, and uses variables measured on the vehicle to determine further state variables. Filtering of the measured variables, as well as sensor monitoring, can also be performed in the estimator.

In particularly advantageous fashion, the method according to the present invention can be embodied in such a way that the forces at the wheels of the vehicle are measured using tire sensors. Tire sensors of this kind can be designed in such a way that magnetized areas or strips, having field lines running preferably in the circumferential direction, are incorporated into each tire. The magnetization is accomplished, for example, in segments, always in the same direction but with opposite orientation, i.e. with alternating polarity. The magnetized strips preferably extend in the vicinity of the rim flange and in the vicinity of the contact patch. The transducers therefore rotate at wheel velocity. Corresponding measured value sensors are preferably mounted on the body at two or more different points in the rotation direction, and moreover are at different radial distances from the rotation axis. An inner measured signal and an outer measured signal can thus be obtained. Rotation of the tire can then be detected by way of the changing polarity of the measured signal or signals in the circumferential direction. From the rolling circumference and the change over time in the inner and outer measured signals it is possible to calculate, for example, the wheel speed. Direct conclusions as to the forces being applied can be drawn from the phase shifts of the measured signals resulting from tire deformation.

It may also be advantageous, however, for the forces at the wheels of the vehicle to be measured using wheel bearing sensors. These can be configured, for example, in such a way that microsensors are incorporated into the rotating portion of the wheel bearing. Forces and accelerations, and the rotation speed, can then be measured by way of microsensors mounted on the movable portion of the wheel bearing. These data can be compared to electronically stored baseline patterns. Additional microsensors can also be built into the static portion of the wheel bearing. The data from these microsensors are once again usable as comparative values for evaluation of the data measured by the sensors mounted on the movable portion of the wheel bearing. The microsensors can be implemented, for example, in the form of microswitch arrays, movable flexural beam systems being provided which are capable of moving laterally, in response to force, against two or more mechanical stops.

The invention builds upon the system of the species in that the controlled variables are forces or torques; that actual values associated with the setpoint values can be calculated from the forces measured at the wheels of the vehicle; and that the ascertained setpoint values and calculated actual values are usable as input values of a control system. In this fashion, the system according to the present invention implements the advantages of the method according to the present invention.

The system according to the present invention is developed in particularly advantageous fashion in that the setpoint values take into account a request by the driver to maintain or modify the present vehicle state. A driver request of this kind may be represented, for example, by the establishment of a steering angle.

It is also advantageous that the lateral force at the center of gravity of the vehicle is usable as a controlled variable. This variable, which is important for cornering, can thus be used as a controlled variable for purposes of the present invention.

In another advantageous development of the invention, provision is made for the torque about the vertical axis of the vehicle to be usable as a controlled variable. This variable as well is particularly important during cornering.

The invention is developed in particularly advantageous fashion in that the setpoint value of the lateral force is determined according to the following equation:

$$F_{y,setpoint} = m \cdot \frac{v^2}{l} \dot{\delta} \frac{1}{1+\left(\frac{v}{v_{CH}}\right)^2},$$

where
$F_{y,setpoint}$=Setpoint value of the lateral force at the center of gravity of the vehicle;
m=Vehicle mass;
v=Vehicle speed;
l=Wheelbase;
δ=Steering angle at front wheels;
$v_{CH}$=Characteristic speed.

The setpoint value of the lateral force is thus obtained from current driving conditions, vehicle-specific parameters, and parameters that take into account the driver request. The equation cited above is an approximation, it being assumed that the float angle is small. A delay must also be taken into account, since the lateral force lags behind the steering angle with a delay of e.g. 0.1 second.

Provision can also advantageously be made for the setpoint value of the torque about the vertical axis of the vehicle to be determined according to the following equation:

$$M_{Z,setpoint} = J_Z \cdot \frac{v}{l} \dot{\delta} \frac{1}{1+\left(\frac{v}{v_{CH}}\right)^2},$$

where
$M_{z,setpoint}$=Setpoint value of the torque about the vertical axis of the vehicle;
m=Vehicle mass;
v=Vehicle speed;
l=Wheelbase;
$\dot{\delta}$=Steering angle rate at the front wheels;
$v_{CH}$=Characteristic speed.

The torque about the vertical axis of the vehicle is thus the product of the torque of inertia $J_z$ and the target yaw acceleration $\Psi_{setpoint}$.

The system according to the present invention is usefully developed by the fact that the actual value of the lateral force is determined according to the following equation:

$$F_y=(F_{y1}+F_{y2})\cos\delta+F_{y3}+F_{y4},$$

where
$F_y$=Actual value of the lateral force at the center of gravity of the vehicle;
Fyi=Wheel force measured at wheel i
δ=Steering angle at front wheels (i=1, 2).

The lateral force used as controlled variable can thus be calculated from the steering angle and the measured wheel forces.

In similarly advantageous fashion, provision is made for the actual value of the torque about the vertical axis of the vehicle to be determined according to the following equation:

$$M_z = (F_{y1}+F_{y2})l_v\cos\delta - (F_{y3}+F_{y4})l_H + (F_{y1}-F_{y2})\frac{S_v}{2}\sin\delta,$$

where
$F_y$=Actual value of the lateral force at the center of gravity of the vehicle;
Fyi=Wheel force measured at wheel i;
δ=Steering angle at front wheels (i=1, 2);
$l_v$=Distance of front wheels (i=1, 2) from center of gravity;
$l_H$=Distance of rear wheels (i=3, 4) from center of gravity;
$S_v$=Track at front axle (i=1, 2).

The actual value of the torque can thus be calculated from the wheel forces, the vehicle-specific variables $l_v$, $l_H$ and $S_v$, and the steering angle representing the driver request.

Control is preferably accomplished via braking interventions, similarly to the situation with vehicle dynamics control systems of the existing art.

It may also be useful, however, for control to be accomplished via steering interventions. An individual-wheel steering system can be used here with particular advantage.

In a further preferred variant of the system according to the invention, that system is developed by the fact that control is accomplished by influencing the vehicle speed. The target lateral force can be decreased by an active braking intervention, so that the lateral force required for the driver request reaches the setpoint value. Additionally or alternatively, an intervention by way of the engine control system is also possible. For the situation described, i.e. an actual value that lies below the lateral force setpoint value, it is also possible to use regulation of the torque about the vertical axis.

It is additionally useful in the context of the system according to the present invention to provide for use of an estimator that generates, from ascertained input values, output values that are taken into account in calculating the actual values and/or setpoint values. For example, the vehicle speed can be determined using an estimator. The output values of the estimator can also be used to calculate, from the forces measured at the wheels, the actual values of the forces at the center of gravity and of the torque about the vertical axis. The estimator can contain a model of the vehicle being controlled, and determines further state variables using variables measured on the vehicle. Filtering of the measured variables, as well as sensor monitoring, can also be performed in the estimator.

In particularly advantageous fashion, the system according to the present invention can be embodied in such a way that the means for measuring forces at wheels of the vehicle encompass tire sensors. Tire sensors of this kind can be designed with magnetization in segments. The magnetized strips preferably extend in the vicinity of the rim flange and in the vicinity of the contact patch. The transducers therefore rotate at wheel velocity. Corresponding measured value sensors are preferably mounted on the body at two or more different points in the rotation direction, and moreover are at different radial distances from the rotation axis. An inner measured signal and an outer measured signal can thus be obtained. Rotation of the tire can then be detected by way of the changing polarity of the measured signal or signals in the circumferential direction. From the rolling circumference and the change over time in the inner and outer measured signals, it is possible to calculate, for example, the wheel speed. Direct conclusions as to the forces being applied can be drawn from the phase shifts of the measured signals resulting from tire deformation.

It may also be advantageous, however, if means for measuring forces at wheels of the vehicle encompass wheel bearing sensors. These can be configured, for example, in such a way that microsensors are incorporated into the rotating portion of the wheel bearing. Forces and accelerations, as well as the rotation speed, can then be measured by way of microsensors mounted on the movable portion of the wheel bearing. These data can be compared to electronically stored baseline patterns.

The invention is based on the recognition that it is possible to use forces or torques, instead of the yaw velocity and float angle derivable therefrom, for control purposes. In particular, it is possible to ascertain, from the wheel forces, values that can be interpreted as actual values of variables related to the center of gravity of the vehicle, so that those variables serve as controlled variables. Instead of the lateral forces and torques about the vehicle's vertical axis cited above by way of example, forces in the longitudinal and vertical direction, or torques about other axes, can also be used as controlled variables.

DETAILED DESCRIPTION

Figure 1:
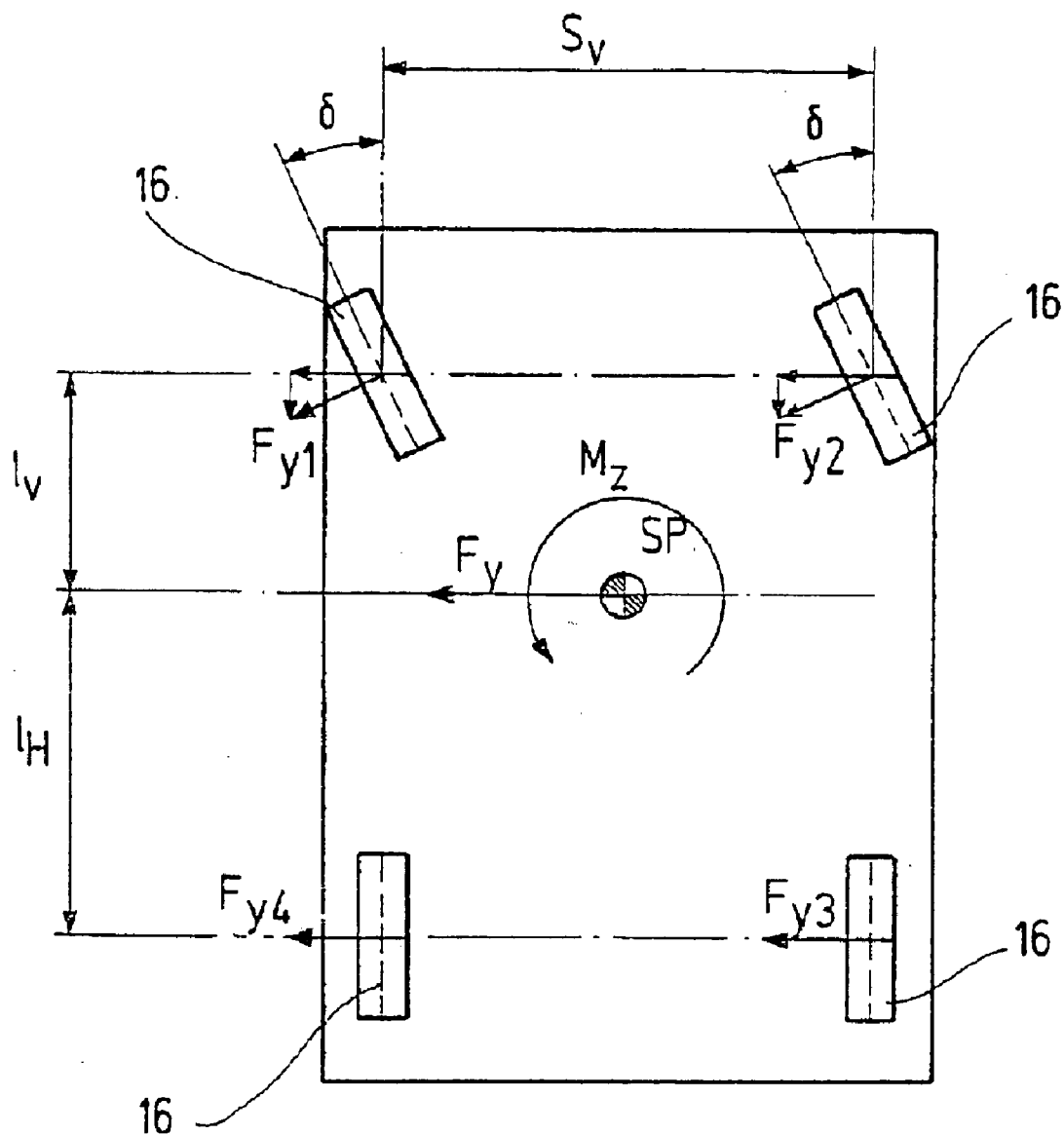
FIG. 1 schematically depicts a vehicle in order to explain physical variables.

FIG. 1 schematically depicts a vehicle in order to explain physical variables. The vehicle has four wheels 16. It is assumed that the vehicle is negotiating a curve at constant speed with no longitudinal forces acting, i.e. without acceleration or deceleration. The following physical variables are suitable for describing this vehicle state:

SP=Center of gravity

δ=Steering angle at front wheels 16

$F_{y1}, \ldots, F_{y4}$=Lateral forces at wheels 16

Fy=Lateral force at center of gravity SP of the vehicle $M_z$=Torque about vehicle's vertical axis (Z axis)

$1_v, 1_H$=Longitudinal data regarding location of center of gravity SP $S_v$=Track at front axle.

When cornering, the desired transverse acceleration can be calculated, from the driver request with steering angle δ and the vehicle speed v, as $$a_{y,setpoint} = \frac{v^2}{l}\delta\frac{1}{1+\left(\frac{v}{v_{CH}}\right)^2},$$

where $l=1_v+1_H$ designates the vehicle's wheelbase and $v_{CH}$ its characteristic speed (M. Mitschke, Dynamik der Kraftfahrzeuge [Dynamics of motor vehicles], Vol. C: Fahrverhalten [Handling characteristics], Springer-Verlag Berlin, Heidelberg 1990). If the float angle is small, the lateral force $F_{y,setpoint}$ is then equal to the centripetal force m * $a_{y,setpoint}$. Taking into account the vehicle mass m as follows:

$$F_{y,setpoint} = m \cdot a_{y,setpoint}$$

the setpoint value for the lateral force $F_y$ is thus known. For correct determination of the lateral force setpoint value $F_y$,setpoint, the time response characteristics of the force increase must additionally be taken into account. The lateral force $F_y$ generally lags behind the steering angle δ with a delay, depending on the vehicle speed, of e.g. 0.1 second.

A target variable for the torque about the vehicle's vertical axis can be determined in comparable fashion on the basis of FIG. 1. Firstly the target yaw acceleration is determined from the change in steering angle, as $$\ddot{\psi}_{setpoint} = \frac{v}{l}\delta\frac{1}{1+\left(\frac{v}{v_{CH}}\right)^2}.$$

The target torque can thus be calculated using the torque of inertia $J_z$:

$$M_{z,setpoint} = J_z \ddot{\psi}_{setpoint}.$$

The target variables for the lateral force on the vehicle at the center of gravity, and for the torque about its vertical axis, are thus derived from the driver request. A variety of control concepts are possible based on these setpoint values.

Firstly, it is possible to control the lateral force $F_y$ and torque $M_z$. Proceeding from the forces $F_{y1}, \ldots, F_{y4}$ measured at the wheels, the lateral force $F_y$ and torque $M_z$ at the center of gravity are determined as:

$$F_y = (F_{y1} + F_{y2})\cos\delta + F_{y3} + F_{y4},$$

$$M_z = (F_{y1} + F_{y2})l_v\cos\delta - (F_{y3} + F_{y4})l_H + (F_{y1} - F_{y2})\frac{S_v}{2}\sin\delta.$$

As long as the lateral force $F_y$ applied by tires 16 is equal to the target force $F_{y,setpoint}$, the transverse acceleration requested by the driver can be achieved. Controlling the torque $M_z$ to the setpoint value prevents the vehicle's longitudinal axis from rotating out of the direction of travel. Control of the torque $M_z$ is accomplished, for example, by way of braking interventions on individual wheels, as is also the case with existing vehicle dynamics control systems, and/or by way of steering interventions. An individual-wheel steering system can be used here with particular advantage.

If the calculated actual value of the lateral force $F_y$ deviates from the lateral force setpoint value $F_{setpoint}$, a correction is then necessary. If $F_y < F_{y,setpoint}$, the lateral force required for the driver request can no longer be transferred to the road surface, i.e. the driver request can no longer be complied with. Two types of control intervention are then possible:

1. Since the desired curve radius can no longer be negotiated at the given speed, the vehicle speed is reduced by way of an active braking intervention and/or an intervention on the engine control system, and the lateral force required is thus decreased.
2. The vehicle can furthermore be stabilized by controlling the torque $M_z$. This control of the torque $M_z$ is accomplished in the same manner as in the situation where the lateral force $F_y$ is equal to the target force $F_{y,setpoint}$.

A further control concept is based on controlling the wheel forces $F_{y1}, \ldots F_{y4}$. For example, using a model of the vehicle that also contains information concerning the type of suspension and the spring characteristic curve, the target lateral wheel forces $F_{y1,setpoint}, \ldots, F_{y4,setpoint}$ are calculable from the setpoint values $F_{y,setpoint}$ and $M_{z,setpoint}$ and established at the individual wheels.

Figure 2:
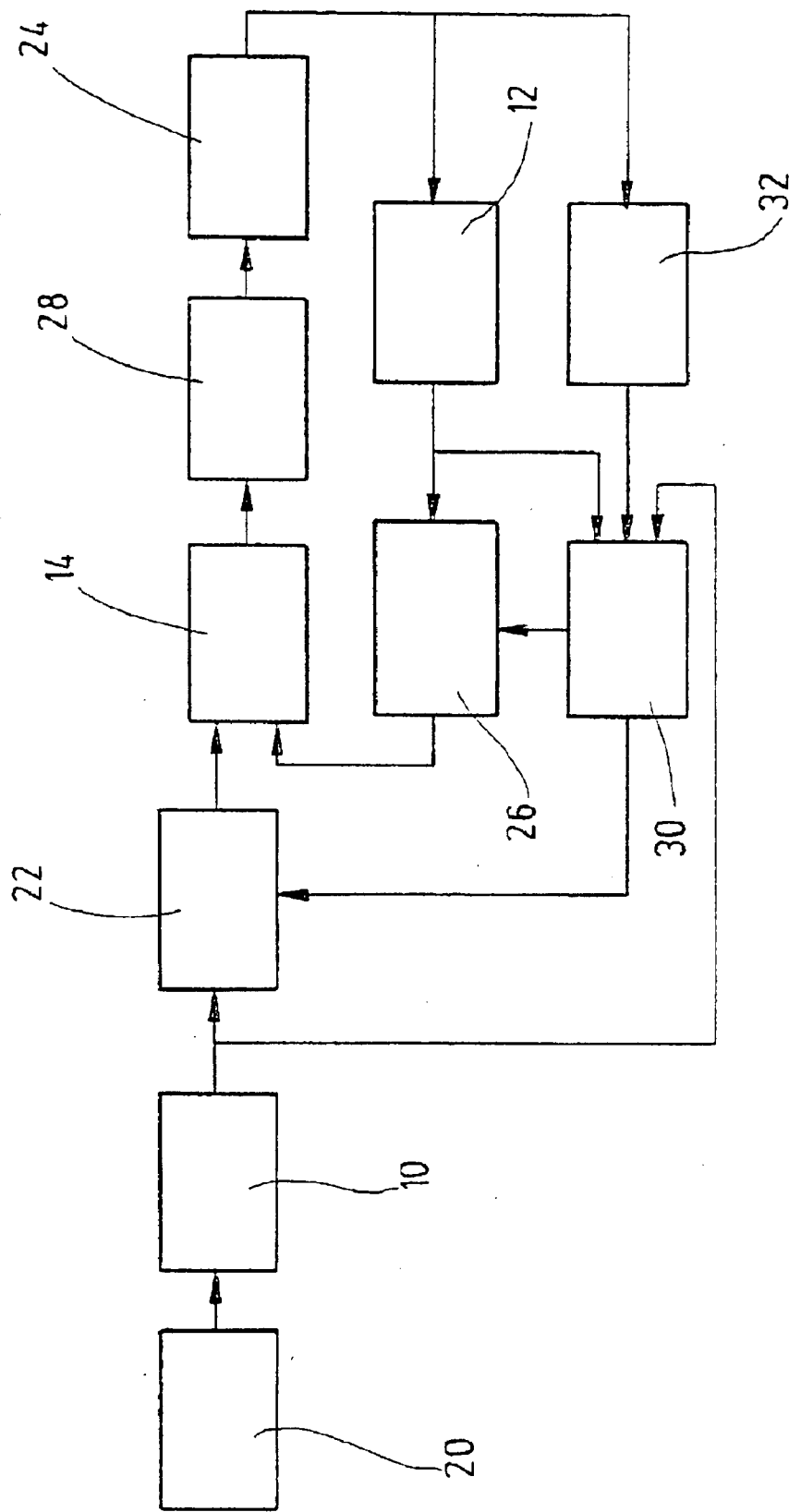
FIG. 2 is a block diagram of a first embodiment of the invention.

FIG. 2 shows a block diagram of a first embodiment of a system according to the present invention. The driving request expressed by a driver 20 is sensed by sensors 10. This driving request can be represented inter alia, for example, by a steering angle. These sensors generate setpoint values 22, for example a target longitudinal force $F_{x,setpoint}$, a target transverse force $F_{y,setpoint}$, a target vertical force $F_{z,setpoint}$, a target torque about the vehicle's vertical axis $M_z$, etc. Numerous other variables about which setpoint values can be generated are conceivable, for example including a torque about the longitudinal axis of the vehicle in order to control roll behavior, or a torque about a transverse axis of the vehicle so that appropriate control mechanisms can be implemented in the context of vehicle rollover. The setpoint values are transferred to a control system 14. The individual wheel forces of vehicle 24 are determined by force sensors 12. These individual force values $F_{xi}, F_{yi}, F_{zi}$, i.e. force values for the individual wheels in all three dimensions, can be converted in calculation unit 26 into various forces and torques, e.g. into longitudinal forces, lateral forces, vertical forces, and torques about the corresponding axes. The actual values of these variables thus ascertained are also inputted into control system 14. Deviations (if any) of the setpoint values from the actual values are then determined in the control system, and actuators 28 are activated as a function thereof. These actuators 28 act on vehicle 24, for example by way of braking and/or steering interventions. Also provided in order to determine the setpoint values is an estimator 30. This receives input data from further sensors 32, the data ascertained by force sensors 12, and the values outputted by sensors 10 that determine the driver request. The output values of estimator 30 influence the calculation of actual values of the controlled variables in calculation unit 26, and the determination of setpoint values 22. With estimator 30 it is possible, for example, to utilize variables such as the vehicle speed, in which context estimator 30 can contain a model of the vehicle being controlled. Estimator 30 can also be suitable for filtering measured variables and performing sensor monitoring.

In addition to the components depicted, a subordinate control system can be provided that, when an active suspension is in use, also influences the normal forces of the individual wheels. Roll motions can thereby be reduced, for example, so that greater lateral forces can ultimately be transferred.

Figure 3:
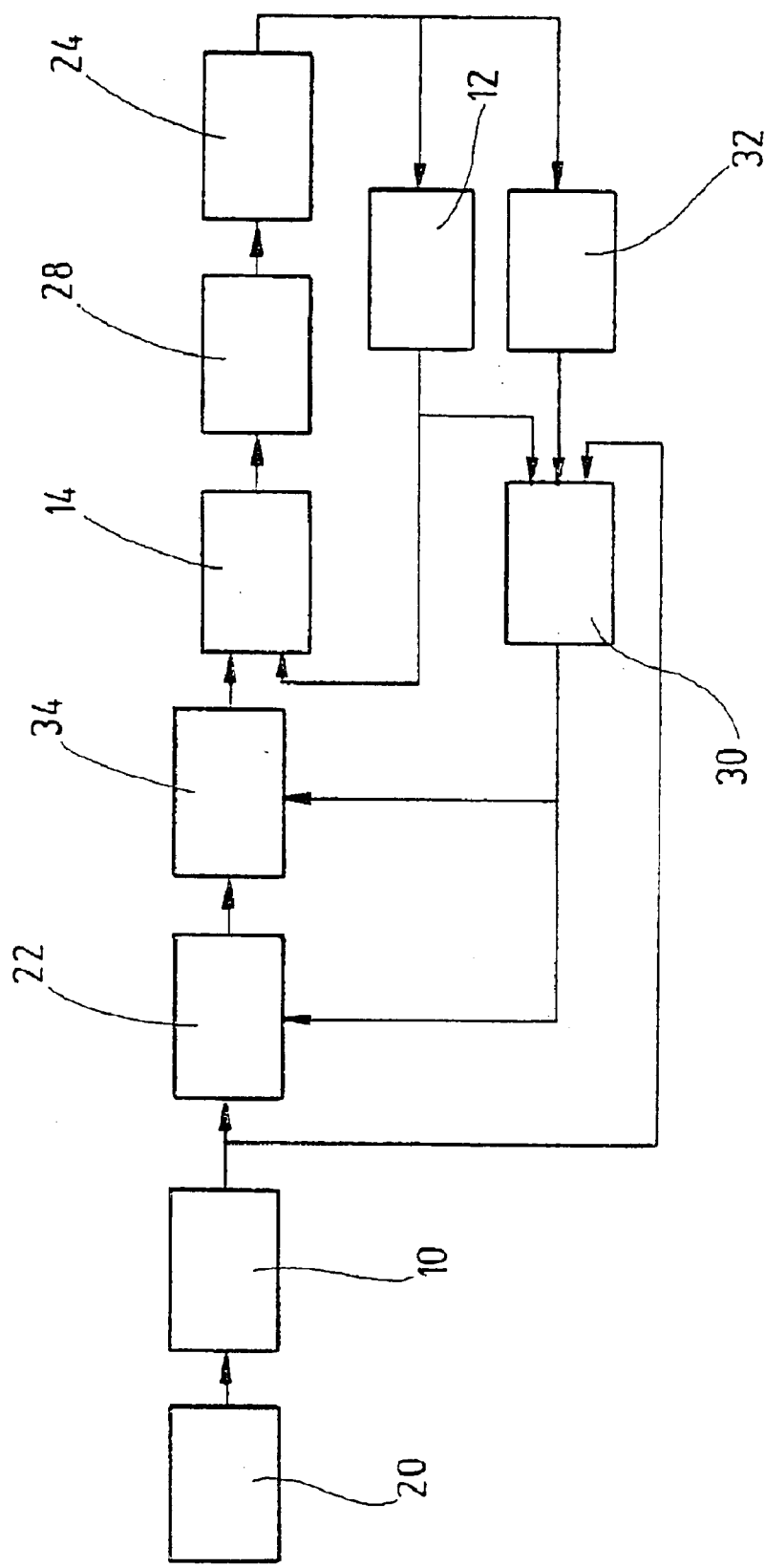
FIG. 3 is a block diagram of a second embodiment of the invention.

FIG. 3 shows a further embodiment of the present invention in the form of a block diagram. This corresponds largely to the arrangement shown in FIG. 2, and identical reference characters designate identical or comparable components. The ascertained setpoint values 22 are, however, first converted in a calculation unit 34 into setpoint values of other variables, in particular into target wheel forces associated with the wheel forces as controlled variables. The downstream control system thus uses the individual wheel forces as controlled variables.

The description above of the exemplified embodiments according to the present invention is intended only for illustrative purposes, and not for the purpose of limiting the invention. Numerous variants and modifications are possible in the context of the invention without leaving the context of the invention and its equivalents.

What is claimed is:

1. A method for controlling a handling characteristic of a vehicle, comprising:
   ascertaining setpoint values that are assigned to controlled variables; and
   measuring forces at wheels of the vehicle, wherein:
   the controlled variables include at least one of a lateral force at a center of gravity of the vehicle and a torque about a vertical axis of the vehicle,
   actual values associated with the setpoint values are calculated from the forces measured at the wheels of the vehicle, and
   the ascertained setpoint values and the calculated actual values are used as input values of a control system.

2. The method as recited in claim 1, wherein:
   the setpoint values take into account a request by a driver to one of maintain and modify a current vehicle state.

3. The method as recited in claim 1, wherein:
   one of the setpoint values corresponds to that of the lateral force and is determined according to the following equation:

$$F_{y,setpoint} = m \cdot \frac{v^2}{l} \delta \frac{1}{1 + \left(\frac{v}{v_{CH}}\right)^2},$$

where
   $F_{y,setpoint}$=setpoint value of the lateral force at the center of gravity of the vehicle;
   m=vehicle mass
   v=vehicle speed;

l=wheelbase;
δ=steering angle at front wheels;
$v_{CH}$=characteristic speed.

4. The method as recited in claim 1, wherein:
one of the setpoint values corresponding to that of the torque about a vertical axis of the vehicle is determined according to the following equation:

$$M_{Z,setpoint} = J_Z \cdot \frac{v}{l} \dot{\delta} \frac{1}{1+\left(\frac{v}{v_{CH}}\right)^2},$$

where
$M_{z,setpoint}$=setpoint value of the torque about the vertical axis of the vehicle;
m=vehicle mass;
v=vehicle speed;
l=wheelbase;
$\dot{\delta}$=steering angle rate at the front wheels;
$v_{CH}$=characteristic speed.

5. The method as recited in claim 3, wherein:
an actual value of the lateral force is determined according to the following equation:

$$F_y = (F_{y1}+F_{y2})\cos\delta + F_{y3}+F_{y4},$$

where
$F_y$=actual value of the lateral force at the center of gravity of the vehicle;
Fyi=wheel force measured at wheel i
δ=steering angle at front wheels (i=1, 2).

6. The method as recited in claim 4, wherein:
an actual value of the torque about the vertical axis of the vehicle is determined according to the following equation:

$$M_Z = (F_{y1}+F_{y2})l_v\cos\delta - (F_{y3}+F_{y4})l_H + (F_{y1}-F_{y2})\frac{S_v}{2}\sin\delta,$$

where
$F_y$=actual value of the lateral force at the center of gravity of the vehicle;
Fyi=wheel force measured at wheel i;
δ=steering angle at front wheels (i=1, 2);
$l_v$=distance of front wheels (i=1, 2) from center of gravity;
$l_H$ distance of rear wheels (i=3, 4) from center of gravity,
$S_v$=track at front axle (i=I, 2).

7. The method as recited in claim 1, wherein:
the control system performs a control via a braking intervention.

8. The method as recited in claim 1, wherein:
the control system performs a control via a steering intervention.

9. The method as recited in claim 1, wherein:
the control system performs a control by influencing a vehicle speed.

10. The method as recited in claim 1, further comprising:
causing an estimator to generate, from the input values, output values that are taken into account in calculating at least one of the actual values and the setpoint values.

11. The method as recited in claim 1, further comprising:
causing tire sensors to measure the forces at the wheels of the vehicle.

12. The method as recited in claim 1, further comprising:
causing wheel bearing sensors to measure the forces at the wheels of the vehicle.

13. A system for controlling a handling characteristic of a vehicle, comprising:
an arrangement for ascertaining setpoint values that are assigned to controlled variables; and
an arrangement for measuring forces at wheels of the vehicle, wherein:
the controlled variables include at least one of a lateral force at a center of gravity of the vehicle and a torque about a vertical axis of the vehicle,
actual values associated with the setpoint values are calculated from the forces measured at the wheels of the vehicle, and
the ascertained setpoint values and the calculated actual values are used as input values of a control system.

14. The system as recited in claim 13, wherein:
the setpoint values take into account a request by a driver to one of maintain and modify a current vehicle state.

15. The system as recited in claim 13, wherein:
one of the setpoint values corresponds to that of the lateral force and is determined according to the following equation:

$$F_{y,setpoint} = m \cdot \frac{v^2}{l} \delta \frac{1}{1+\left(\frac{v}{v_{CH}}\right)^2},$$

where
$F_{y,setpoint}$=setpoint value of the lateral force at the center of gravity of the vehicle;
m=vehicle mass
v=vehicle speed;
l=wheelbase;
δ=steering angle at front wheels;
$v_{CH}$=characteristic speed.

16. The system as recited in claim 13, wherein:
one of the setpoint values corresponding to that of the torque about a vertical axis of the vehicle is determined according to the following equation:

$$M_{Z,setpoint} = J_Z \cdot \frac{v}{l} \dot{\delta} \frac{1}{1+\left(\frac{v}{v_{CH}}\right)^2},$$

where
$M_{z,setpoint}$=setpoint value of the torque about the vertical axis of the vehicle;
m=vehicle mass;
v=vehicle speed;
l=wheelbase;
$\dot{\delta}$=steering angle rate at the front wheels;
$v_{CH}$=characteristic speed.

17. The system as recited in claim 15, wherein:
an actual value of the lateral force is determined according to the following equation:

$$F_y = (F_{y1}+F_{y2})\cos\delta + F_{y3}+F_{y4},$$

where
$F_y$=actual value of the lateral force at the center of gravity of the vehicle;
Fyi=wheel force measured at wheel i
δ=steering angle at front wheels (i=1, 2).

18. The system as recited in claim 16, wherein:

an actual value of the torque about the vertical axis of the vehicle is determined according to the following equation:

$$M_z = (F_{y1} + F_{y2})l_v\cos\delta - (F_{y3} + F_{y4})l_H + (F_{y1} - F_{y2})\frac{S_v}{2}\sin\delta,$$

where
- $F_y$=actual value of the lateral force at the center of gravity of the vehicle;
- Fyi=wheel force measured at wheel i;
- $\delta$=steering angle at front wheels (i=1, 2);
- $l_v$=distance of front wheels (i=1, 2) from center of gravity;
- $l_H$=distance of rear wheels (i=3, 4) from center of gravity;
- $S_v$=track at front axle (i=1, 2).

19. The system as recited in claim 13, wherein:

the control system performs a control via a braking intervention.

20. The system as recited in claim 13, wherein:

the control system performs a control via a steering intervention.

21. The system as recited in claim 13, wherein:

the control system performs a control by influencing a vehicle speed.

22. The system as recited in claim 13, further comprising:

an estimator that generates, from the input values, output values that are taken into account in calculating at least one of the actual values and the setpoint values.

23. The system as recited in claim 13, further comprising:

tire sensors that measure the forces at the wheels of the vehicle.

24. The system as recited in claim 13, further comprising:

wheel bearing sensors that measure the forces at the wheels of the vehicle.

* * * * *

UNITED STATES PATENT AND TRADEMARK OFFICE
CERTIFICATE OF CORRECTION

PATENT NO. : 6,862,512 B2
DATED : March 1, 2005
INVENTOR(S) : Dietmar Arndt et al.

It is certified that error appears in the above-identified patent and that said Letters Patent is hereby corrected as shown below:

Column 3,
Line 29, change "acceleration $\Psi_{setpoint}$." to -- acceleration $\ddot{\psi}_{setpoint}$ --.

Line 35, change "$F_y=(F_{y1} + F_{y2})\cos\delta$" to -- $Fy=(F_{y1} + F_{y2})\cos\delta$ --.

Column 6,
Line 16, change "acceleration $\Psi_{setpoint}$." to -- acceleration $\ddot{\psi}_{setpoint}$ --.

Column 8,
Line 58, change " $M_{z,setpoint}=J_z\psi_{setpoint}$. " to -- $M_{z,setpoint} = J_z \dot{\psi} setpoint$ --.

Signed and Sealed this

Fourteenth Day of March, 2006

JON W. DUDAS
*Director of the United States Patent and Trademark Office*